(12) United States Patent
Koslowski

(10) Patent No.: US 11,407,293 B2
(45) Date of Patent: Aug. 9, 2022

(54) INTERCHANGEABLE CONVERTIBLE ROOF APPARATUS

(71) Applicant: MyTop IP, LLC, Atlanta, GA (US)

(72) Inventor: Christoph Koslowski, Northwest Atlanta, GA (US)

(73) Assignee: MyTop IP, LLC, Atlanta, GA (US)

( * ) Notice: Subject to any disclaimer, the term of this patent is extended or adjusted under 35 U.S.C. 154(b) by 176 days.

(21) Appl. No.: 16/896,717

(22) Filed: Jun. 9, 2020

(65) Prior Publication Data

US 2020/0406729 A1 Dec. 31, 2020

Related U.S. Application Data

(60) Provisional application No. 62/866,251, filed on Jun. 25, 2019.

(51) Int. Cl.
*B60J 7/12* (2006.01)
*B62D 65/06* (2006.01)

(52) U.S. Cl.
CPC .......... *B60J 7/1239* (2013.01); *B60J 7/1243* (2013.01); *B60J 7/1269* (2013.01); *B62D 65/06* (2013.01)

(58) Field of Classification Search
CPC ....... B60J 7/1247; B60J 7/1239; B60J 7/1243
USPC ......... 296/107.01, 110, 121, 107.09, 107.11, 296/136.05, 136.1, 136.07, 136.11
See application file for complete search history.

(56) References Cited

U.S. PATENT DOCUMENTS

| | | | |
|---|---|---|---|
| 7,029,052 B2 | 4/2006 | Troeger et al. | |
| 7,216,920 B2 | 5/2007 | Harrison, III | |
| 7,469,954 B2* | 12/2008 | Fallis, III | B60J 7/10 296/105 |
| 7,559,596 B2 | 7/2009 | Garska et al. | |
| 7,690,716 B2* | 4/2010 | Dilluvio | B60J 7/0069 296/108 |
| 8,608,225 B2 | 12/2013 | Barker | |
| 8,672,389 B2 | 3/2014 | Barker | |
| 9,216,632 B2 | 12/2015 | Lewis et al. | |

(Continued)

OTHER PUBLICATIONS

Bestop® internet publication: www.bestop.com/supertop-ultra-ik (published and printed on Jun. 24, 2019).

(Continued)

*Primary Examiner* — Joseph D. Pape
(74) *Attorney, Agent, or Firm* — Harness Dickey & Pierce PLC

(57) ABSTRACT

An interchangeable convertible roof apparatus is provided. In another aspect, a lower roof bow pivot is interchangeable between multiple locations depending on which roof cover configuration is desired during top stack mechanism assembly. A further aspect employs identically same side rails, roof bows and linkages between a fastback convertible roof configuration and a squareback convertible roof configuration, except for a roof bow located above and adjacent to a back window (when in a closed position), such as a four-bow, and optionally a mounting bracket. Still another aspect employs a fastener to allow the same fabric roof cover to be interchanged between differently sized configurations when in its closed position. Moreover, a brace stationarily secures a vehicular roll bar to a top stack mechanism of a convertible roof in a rigidly attached manner.

18 Claims, 8 Drawing Sheets

(56) References Cited

U.S. PATENT DOCUMENTS 9,415,669 B2   8/2016  Barker
9,744,837 B2 * 8/2017  White ..................... B60J 11/04

OTHER PUBLICATIONS

Bestop® catalog—"2019 Soft Tops & Accessories for Jeep®" (published prior to Jun. 2019).

* cited by examiner

INTERCHANGEABLE CONVERTIBLE ROOF APPARATUS

CROSS-REFERENCE TO RELATED APPLICATION

This application claims the benefit of U.S. Provisional Application No. 62/866,251, filed on Jun. 25, 2019. The entire disclosure of the above application is incorporated by reference herein.

BACKGROUND AND SUMMARY

The present disclosure relates generally to convertible roofs and more particularly to an interchangeable convertible roof apparatus for use with an automotive vehicle.

Soft top convertible roofs for automotive vehicles are well known. For example, reference should be made to U.S. Pat. No. 7,559,596 entitled "Soft-Top Convertible Roof" which issued to Garska et al. on Jul. 14, 2009; U.S. Pat. No. 7,216,920 entitled "Single Convertible Top Mechanism Architecture which will Accept Multiple Roof Configurations" which issued to Harrison, III on May 15, 2007; and U.S. Pat. No. 7,029,052 entitled "Convertible Soft Top for a Sport Utility or Similar Vehicle" which issued to Troeger et al. on Apr. 18, 2006. All of these patents are incorporated by reference herein. None of these traditional convertible roof designs are well suited for significantly larger dimensional differences of the roof cover above a rear window or backlite such as occurs between a fastback convertible roof and a squareback convertible roof which can exceed a six inch fore-and-aft difference. The conventional tops either employ very complicated mechanisms or solely pertain to a five-bow.

In accordance with the present invention, an interchangeable convertible roof apparatus is provided. In another aspect, a lower roof bow pivot is interchangeable between multiple locations depending on which roof cover configuration is desired during top stack mechanism assembly. A further aspect employs identically same side rails, roof bows and linkages between a fastback convertible roof configuration and a squareback convertible roof configuration, except for a roof bow located above and adjacent to a back window (when in a closed position), such as a four-bow, and optionally a mounting bracket. Still another aspect employs a fastener to allow the same fabric roof cover to be interchanged between differently sized configurations when in its closed position. Moreover, a brace stationarily secures a vehicular roll bar to a top stack mechanism of a convertible roof in a rigidly attached manner. A method of assembling an interchangeable automotive vehicle convertible roof apparatus is also provided.

The present apparatus and method are advantageous over prior constructions. For example, the present construction allows a vehicle user to manually interchange between different convertible roof shapes with minimal attachment or adjustment of mechanical components. The present apparatus and method also reduce manufacturing part costs, tooling costs and part quantities by sharing at least a majority of top stack mechanism components between different convertible roof size configurations. The present apparatus and method advantageously employ minimal extra parts which are easy to interchange for the different fabric tops. Additional advantages and features of the present apparatus and method will become apparent from the following description and appended claims, taken in conjunction with the accompanying drawings.

DETAILED DESCRIPTION

Figure 1:
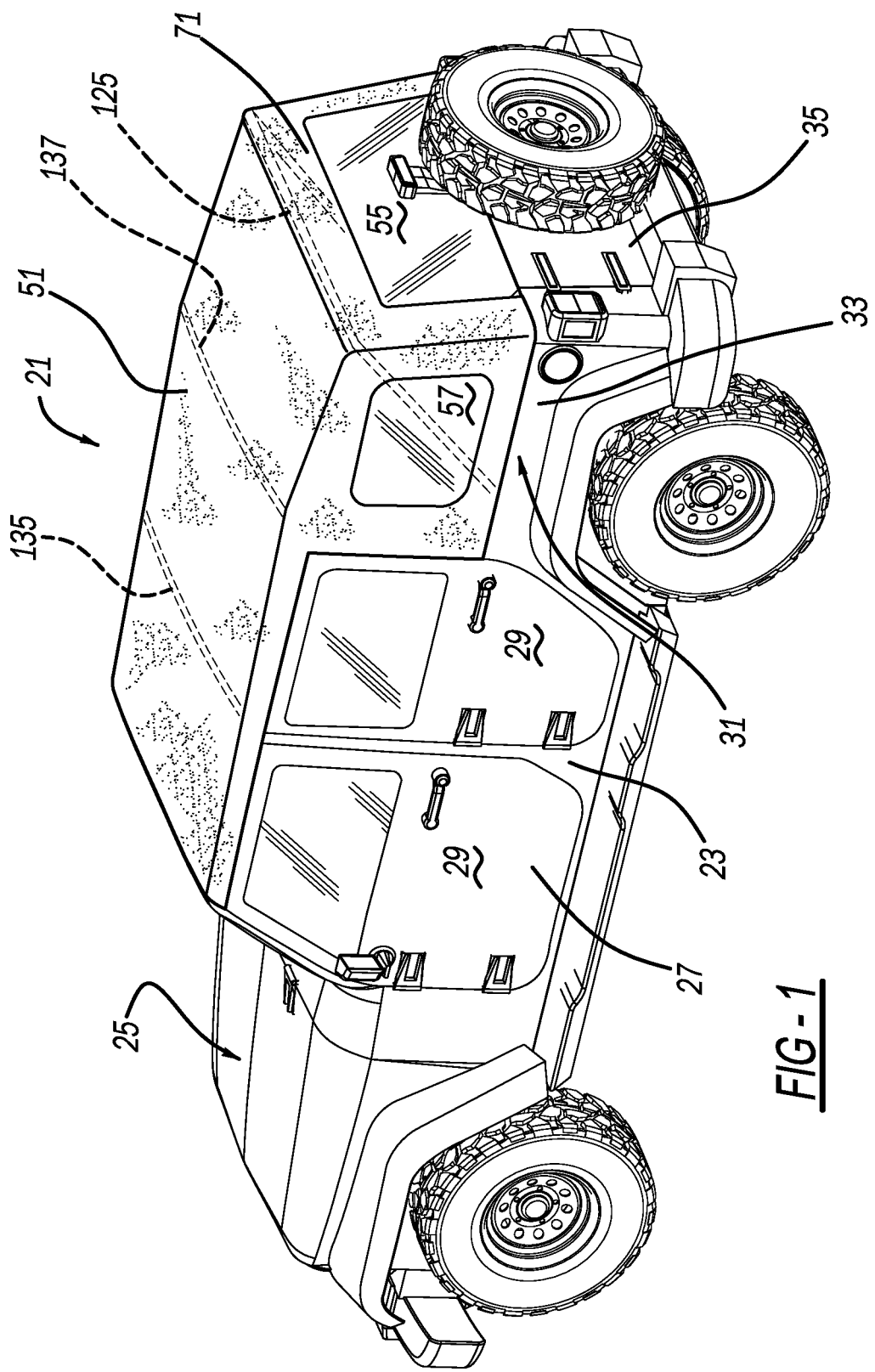
FIG. 1 is a perspective view showing a squareback convertible roof configuration.

An interchangeable convertible roof apparatus 21 is employed on an automotive vehicle 23, preferably a sport utility vehicle ("SUV") such as a Jeep® brand vehicle. This can best be observed in FIGS. 1-4. Automotive vehicle 23 has an engine compartment 25, a passenger compartment 27 between opposite side passenger doors 29, and a rear cargo compartment 31 defined by a generally horizontal bed, generally vertically extending sidewalls 33 and a moveable rear door or tailgate 35. Auxiliary passenger seating may be present within the rear compartment 31. Preferably there are four side passenger doors (with associated door openings if the doors are removed).

Furthermore, a pair of diagonally extending and tubular roll bars 37 span above rear compartment 31 adjacent to sidewalls 33 in a spaced apart manner. An optional horizontally elongated roll bar member is coupled between the generally diagonally extending roll bar members. The diagonal members may be partially or continuously curved. Roll bars 37 are rigidly mounted in a stationary manner to the vehicle's sheet metal structure.

Convertible roof apparatus 21 includes a soft-top fabric roof cover 51 connected to a moveable top stack mechanism 53. A rear window or backlite 55 and optional side windows 57 are attached to roof cover 51, and are preferably a flexible polymeric and transparent material. Weather strips and latches interface between the convertible roof and the stationary roof structure 59 surrounding passenger doors 29 and above a front windshield at a front header 61. Convertible roof 21 is moveable from the fully raised and closed position shown in FIGS. 1-3 to the fully retracted and open position shown in FIG. 4.

Figure 2:
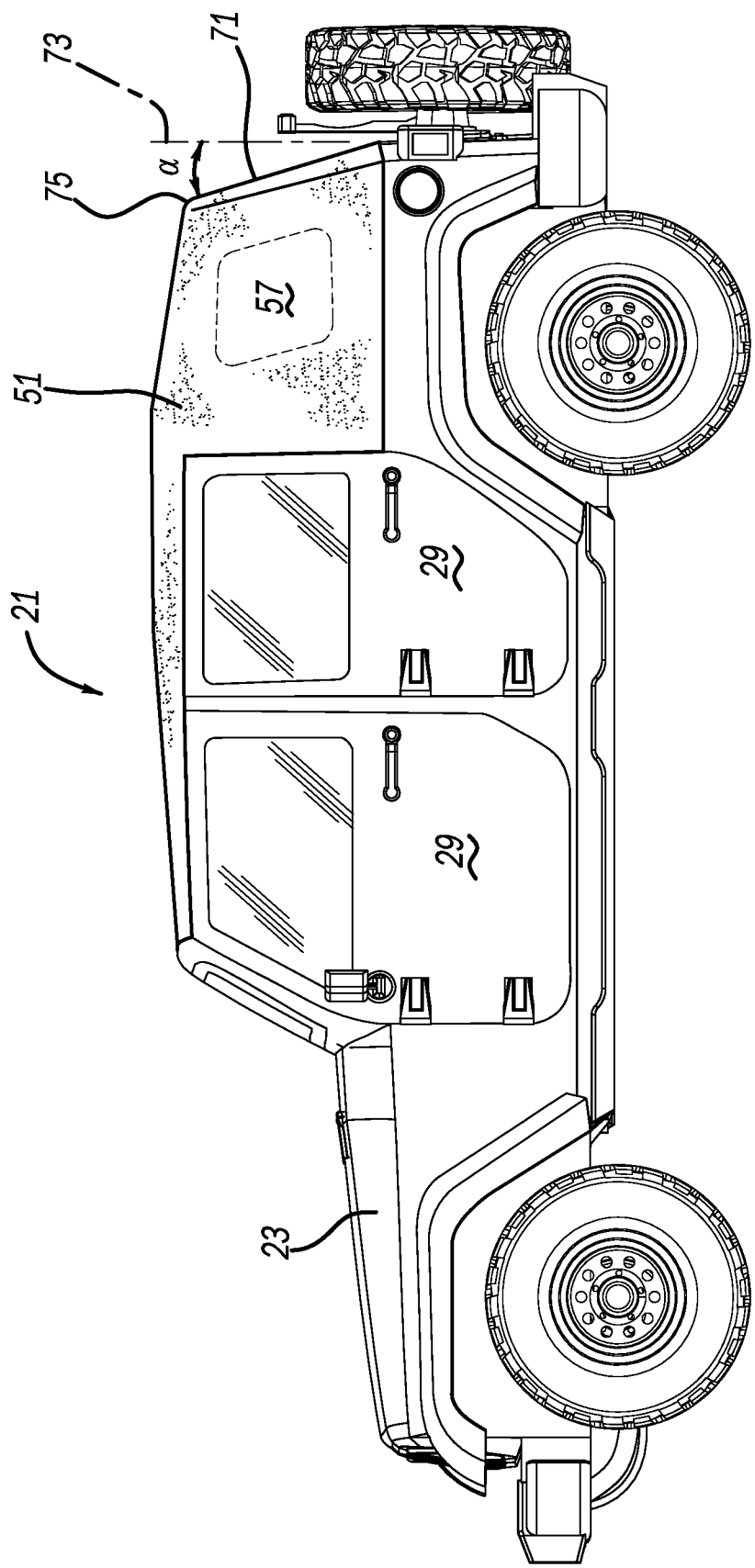
FIG. 2 is a side elevational view showing the squareback convertible roof configuration.
Figure 3:
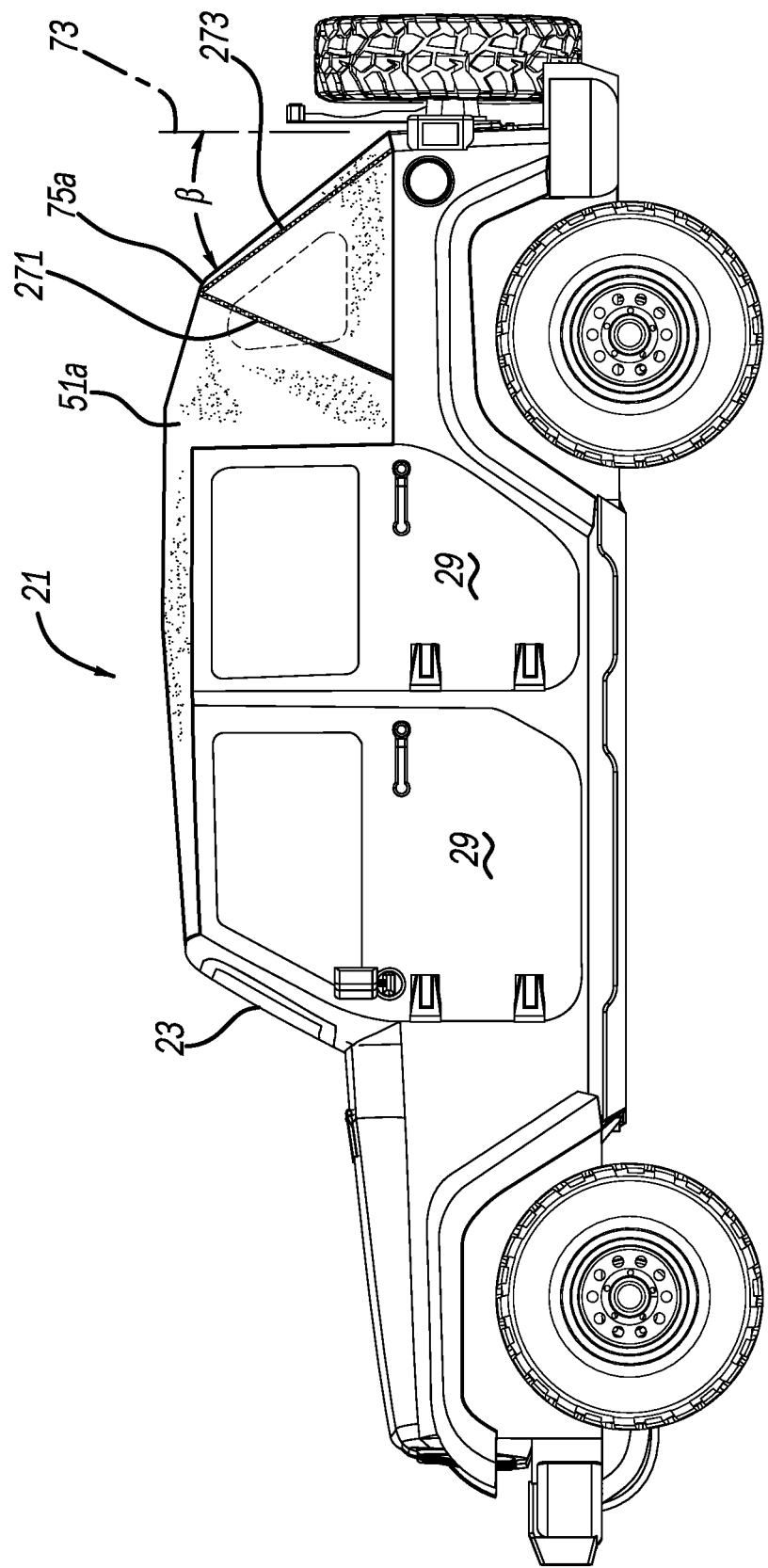
FIG. 3 is a side elevational view showing a fastback convertible roof configuration.
Figure 4:
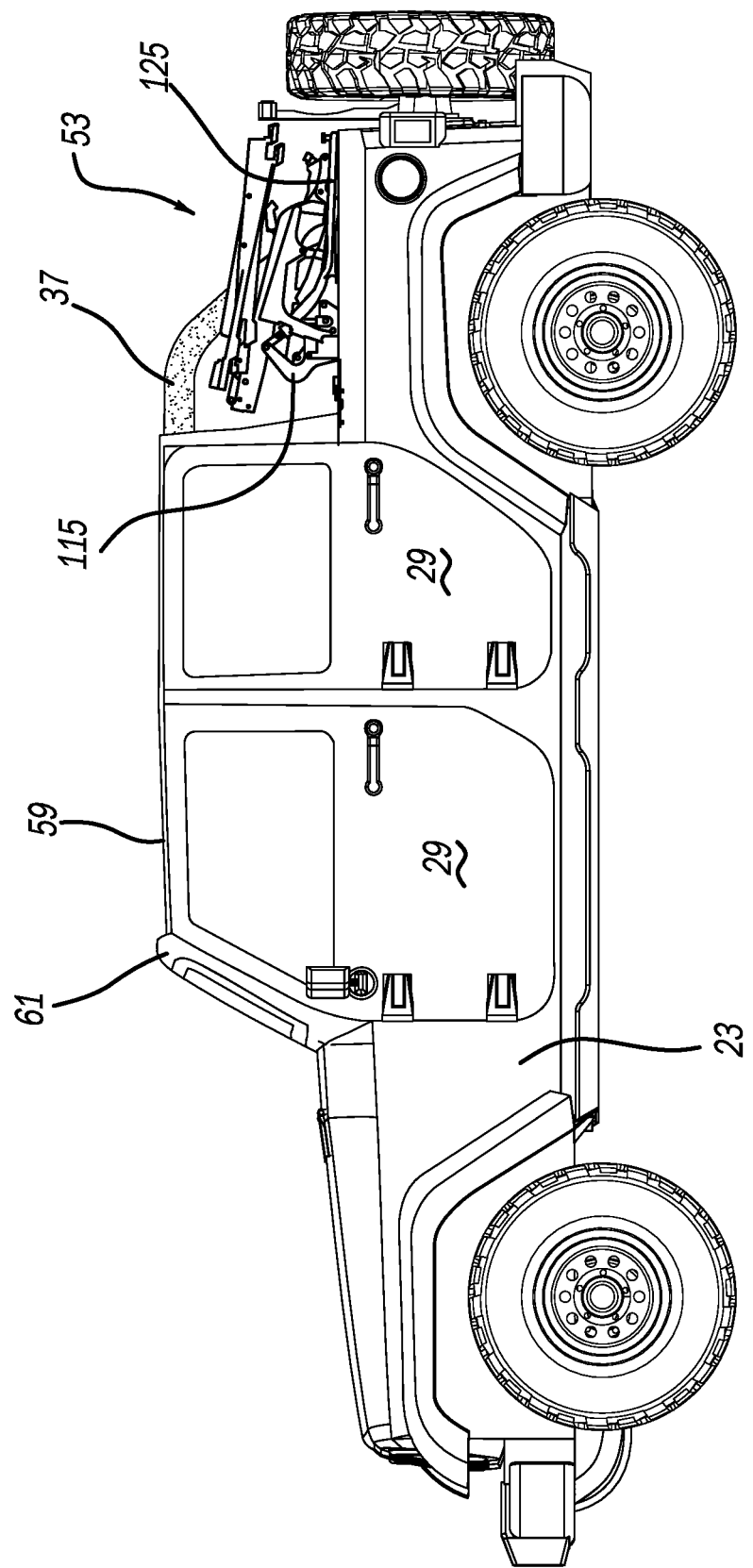
FIG. 4 is a perspective view showing either of the convertible roof configurations in a retracted and open position, with the fabric roof cover removed.
Figure 5:
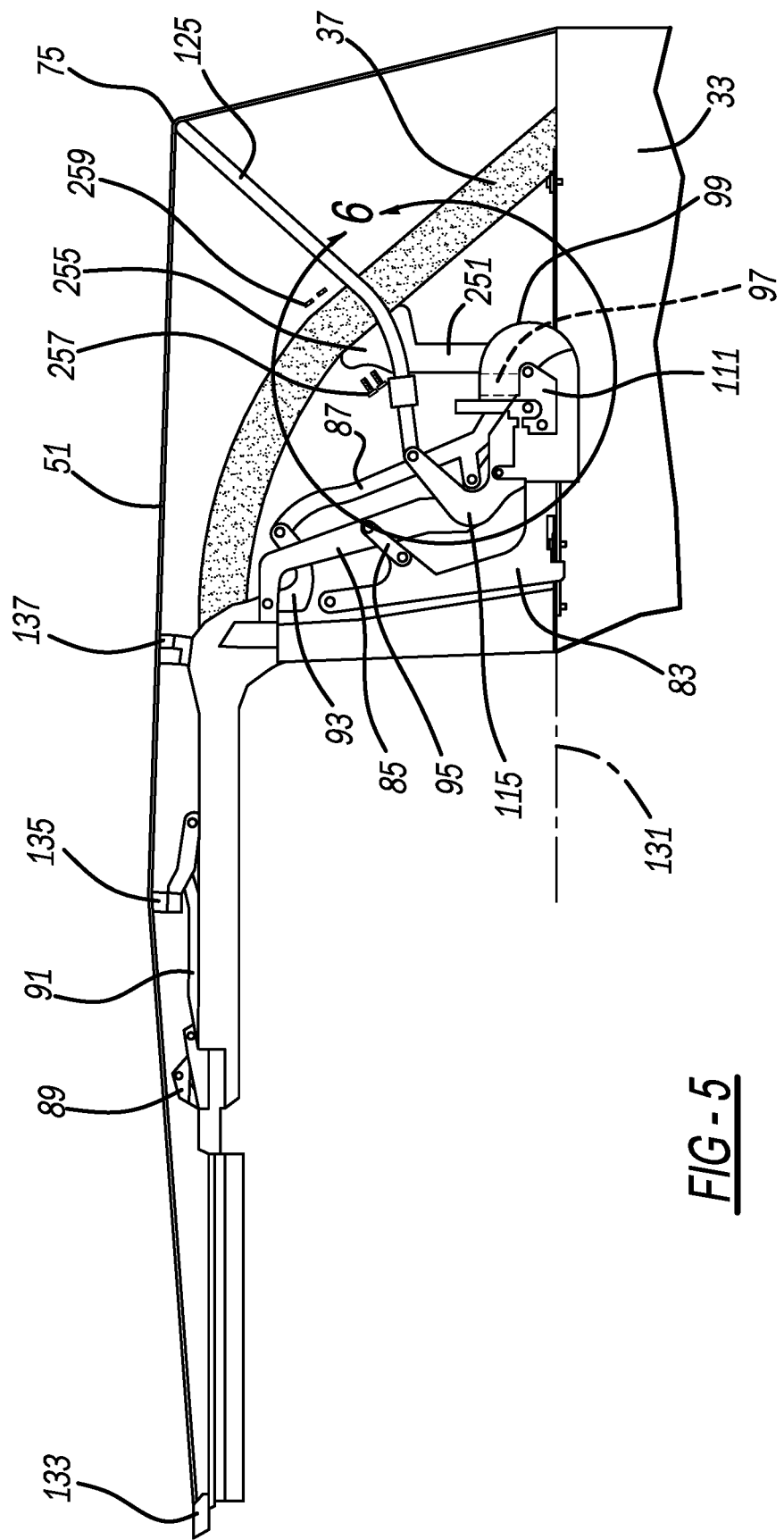
FIG. 5 is a side elevational view, with a roof cover only at its centerline, showing the squareback convertible roof in the closed position.
Figure 7:
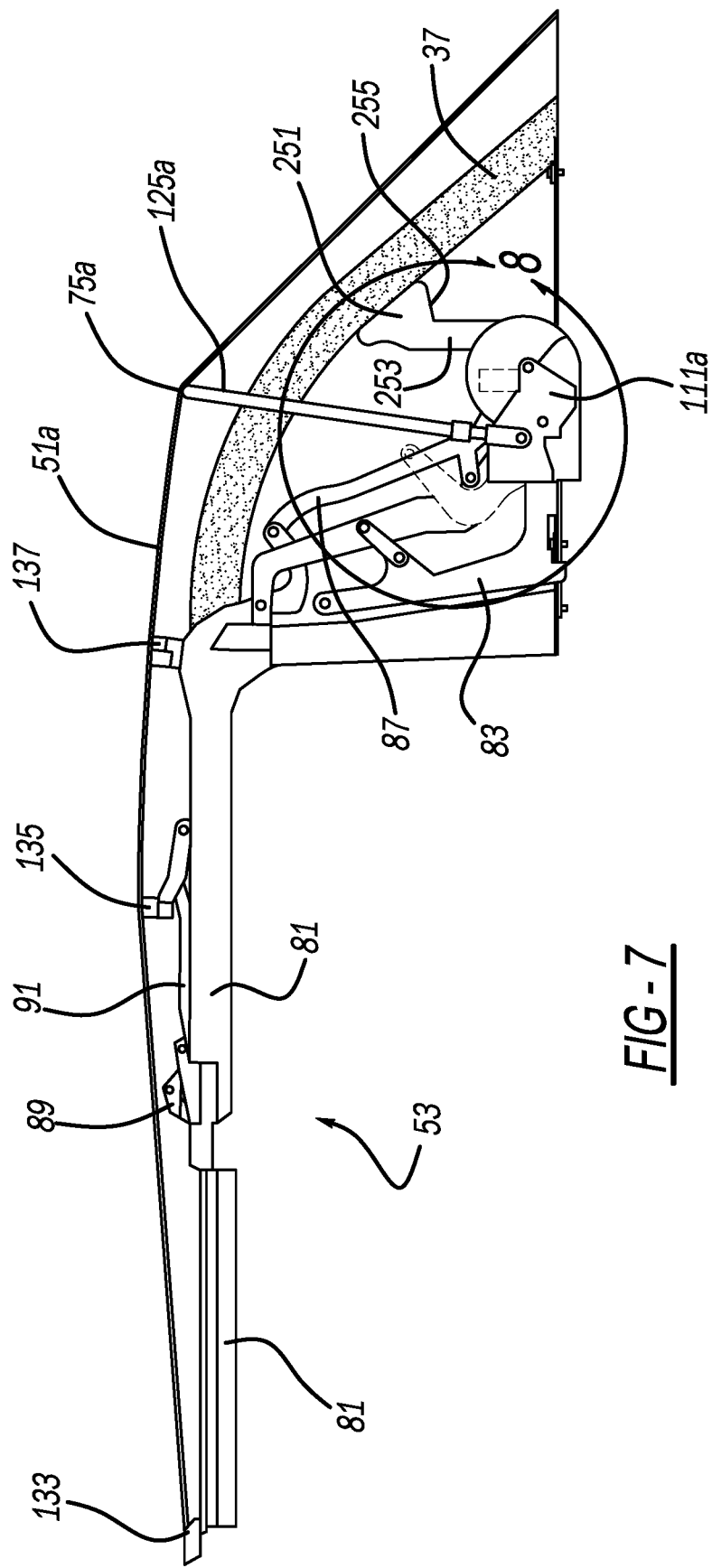
FIG. 7 is a side elevational view, with a roof cover only at its centerline, showing the fastback convertible roof in the closed position.

FIGS. 1, 2 and 5 illustrate a squareback convertible roof configuration wherein a rear surface 71 of roof cover 21 (including backlite 55) has an angle $\alpha$ of approximately 10-25°, and more preferably 20°, from a vertical plane 73. FIGS. 3 and 7 show a rear surface 71a at approximately 30-60°, and more preferably 40°, from vertical plane 73 to define an angle $\beta$. Therefore, an upper rear corner 75 and 75a for the squareback and fastback configurations, respectively, have at least a ten inch fore-and-aft dimensional difference.

Referring now to FIGS. 5 and 7, top stack mechanism 53 includes side roof rails or frames 81, an L-arm link 83, a driving link 85, a balance link 87 and various other coupling linkages 89, 91, 93 and 95. An electric motor actuator 97 drives a sector gear 99 through an output pinion gear, which in turn, raises and lowers top stack mechanism 53 and the associated roof cover 51. The rail and linkage components are similar to those described in U.S. Pat. No. 9,415,669 entitled "Retractable Top for an Open Vehicle" which issued to Barker on Aug. 16, 2016, and is incorporated by reference herein. Proximity switches 101, an electrical control system and an electrical circuit serve to energize the electric motor upon the vehicle user's actuation of a passenger compartment located switch.

Figure 6:
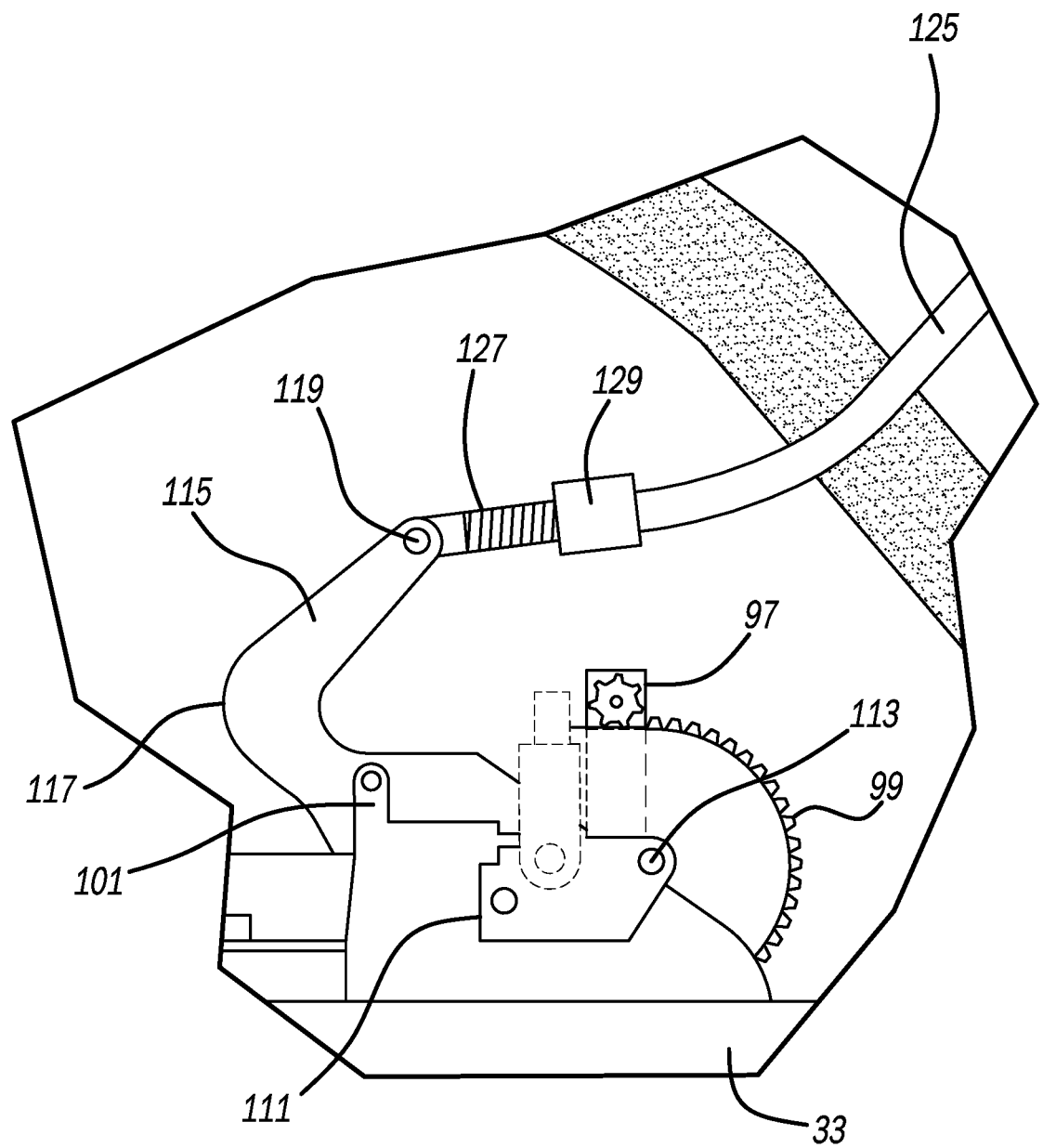
FIG. 6 is an enlarged fragmentary view, taken within circle 6 of FIG. 5.

Reference should now be made to FIGS. 5 and 6 with regard to the squareback roof configuration. A mounting bracket 111 is stationarily coupled to vehicle side wall 33 in the manner disclosed in the Barker patent. Mounting bracket includes a rear pivot 113 about which rotates sector gear 99. Furthermore, a goose-neck angled arm 115 projects from a front upper corner of mounting bracket 111 as an integral single piece, with an intermediate elbow 117 forwardly extending past the lower portion of mounting bracket 111 and also entirely forward of sector gear 113 and electric motor 97. An upper pivot 119 of arm 115 and mounting bracket 111 is located rearward and above intermediate elbow 117 and is also located entirely above sector gear 99 and electric motor 97.

A lower end of number four-bow or edge bow 125 is pivotably coupled to mounting bracket 111 via a coupling 127. Coupling 127 has a generally flat proximal end which is rotatably connected to arm 115 at pivot 119 by way of a shoulder bolt and nut fastener, smooth dowel and cotter pin, or the like. A distal opposite end of coupling 127 is an externally threaded rod which is adjustably engageable with one or more internally threaded nuts 129. Furthermore, nut 129 is retained upon the hollow lower end of four-bow 125 such that manual rotation of nut 129 will linearly advance or retract a distal end of coupling 127 into and out of the open hollow end of four-bow 125 to allow for fabric tensioning and more significantly, entire four-bow removal for interchangeability.

It should be appreciated that mounting bracket 111 with its arm 115 as well as coupling 127 are in mirrored symmetry on both left and right sides of the vehicle in order to mate with and move the inverted U-shaped four-bow 125. It is also noteworthy that a majority of mounting bracket 111, all of arm 115 and all of coupling 127 are vertically located above a beltline 131 of the vehicle which coincides with a horizontal plane spanning between uppermost portions of side walls 33 (see FIG. 1) of the rear compartment. Additionally, top stack mechanism 53 includes a forwardmost one-bow 133, a number two-bow 135 and a number three-bow 137 located therebehind in a spaced apart arrangement, which all span in generally horizontal directions between the side rails below the fabric roof cover 51 when the convertible roof is in the closed position.

Figure 8:
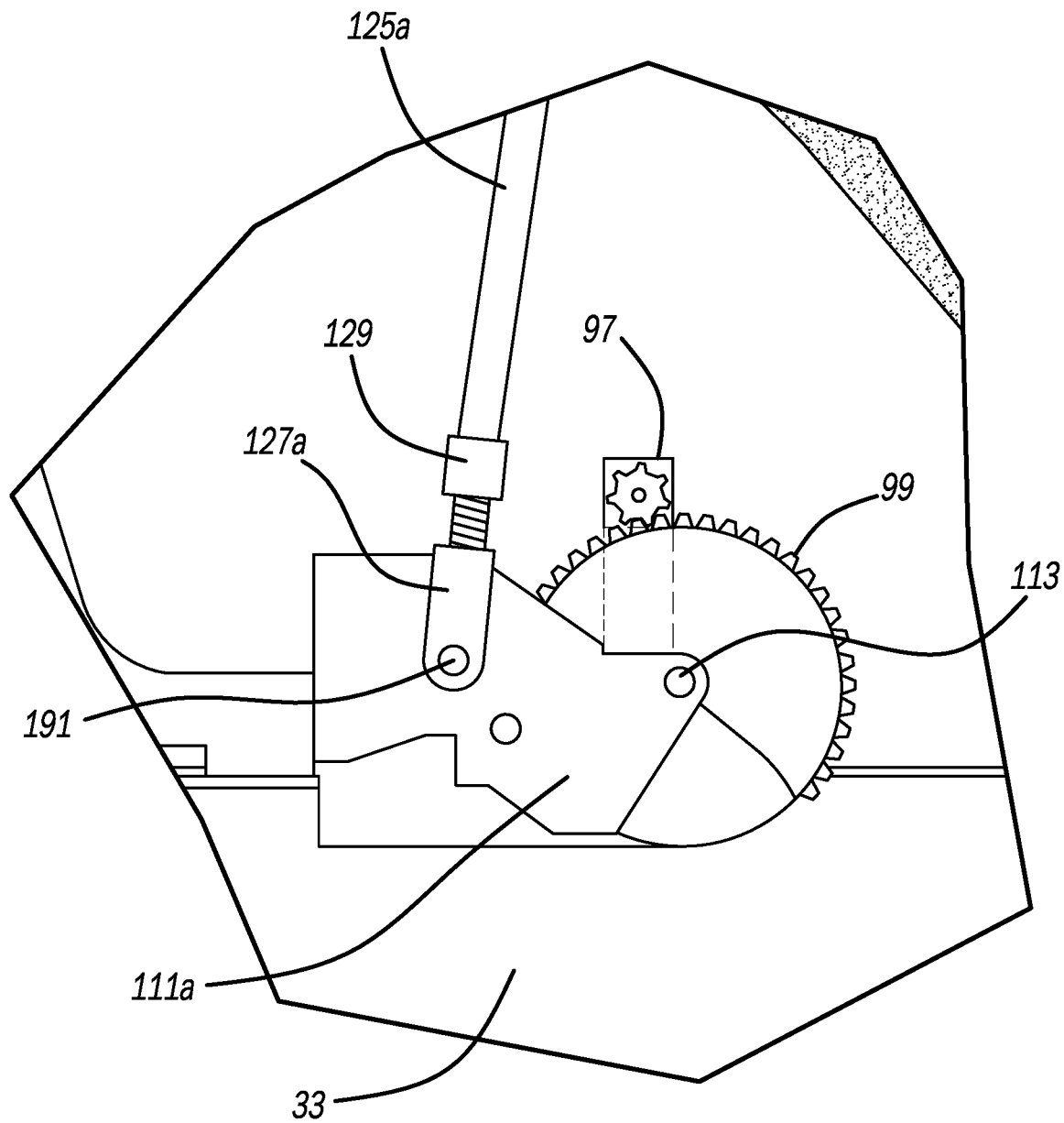
FIG. 8 is an enlarged fragmentary view, taken within circle 8 of FIG. 7.

FIGS. 7 and 8 illustrate the portions of the top stack mechanism 53 unique to the fastback top configuration. The rails and linkages as well as number one through three roof bows are all identical between the squareback and fastback configurations. However, a four-bow 125a and optionally a smaller mounting bracket 111a are different between the roof configurations. In the fast top configuration, number four-bow 125a has its lower pivot 191 manually moved to a generally middle location of mounting bracket 111a which is vertically lower and rear of pivot 119 (see FIG. 6). Thus, goose-neck arm 115 (see FIG. 6) of the squareback configuration is not necessary and may optionally be removed if a different bracket 111a is employed. Alternately, if a common mounting bracket is employed for both roof configurations, then the goose-neck arm will remain but be unused.

Similarly, it is envisioned that the pivoting portion of coupling 127 (see FIG. 6) will be moved to that of 127a (see FIG. 8), however, it is alternately envisioned that two couplings 127 and 127a can be simultaneously employed with one being unused and the other being coupled to an end of four-bow 125 or 125a depending on the configuration desired at that time (as is shown in FIGS. 5 and 6). This allows for easy day-to-day interchangability of convertible top configurations in a manual manner with only replacement of the four-bow. Alternately, both couplings 127 and 127a may be rotatably attached to a single common mounting bracket 111, but the couplings can be of different lengths and/or shapes, so a single common four-bow 125 can be interchanged therebetween. Moreover, four-bow 125a has entirely straight lower tubular legs (when viewed in the raised position) while four-bow 125 (see FIGS. 5 and 6) has an intermediate curve in its lower legs.

FIGS. 5 and 7 illustrate a metallic brace or support 251 which includes a generally vertically extending and elongated middle segment 253, and a fore-and-aft and diagonally oriented expanded flange segment 255. Flange segment 255 is stationarily fastened to a diagonal section of roll bar 37 through threaded bolts and nuts 257 and 259, respectively, rivets or the like. A lower segment of brace 251 is bolted, riveted, other otherwise fastened to top stack mechanism 53 at either mounting bracket 111, another bracket attached to mounting bracket 111, or a stationary portion of a side rails or linkages. Brace 251 advantageously supplies a raised and rigid mounting location to the rear portion of top stack mechanism 53 in addition to where it is attached to the rear vehicle compartment. Brace 251 is preferably located on each mirrored image symmetrical side of the top stack mechanism. It is noteworthy, however, that the brace-to-roll bar attachment is not intended to serve as a pivot for the top stack mechanism.

Another aspect of convertible roof apparatus 21 can be seen in FIGS. 3 and 5. A pair of zipper fasteners 271 and 273 are located on side and rear portions of roof cover 51 and 51a. If this optional fastener arrangement is employed then side windows 57 and 57a may need to be of different size, location, or removed. When the zipper fasteners 271 and 273 are zipped up and fastened (as shown in FIG. 3), the extra and larger fabric material adjacent top rear corner 75 of the squareback configuration is internally folded up and stored inside as part of the convertible roof when in the fastback condition. Conversely, when the fasteners 271 and 273 are unzipped and unfastened, the extra material adjacent top rear corner 75 can be expanded to the squareback configuration. Additional straps and/or hook and loop fasteners, buttons, snaps, pockets or the like may be employed to stow the extra fabric material when in the fastback position. Moreover, other fasteners can be used in place of zippers.

While various embodiments have been disclosed, it should be appreciated that other variations may be employed. An exemplary topstack linkage mechanism has been disclosed, however, other mechanisms with more or less linkages, rails or bows can be used although certain benefits may not be achieved. Furthermore, exemplary materials and shapes have been identified but other materials and shapes may be employed. The brace-to-roll bar mounting and/or the zipper fastener for configuration interchangeability, may be used with otherwise conventional convertible roofs or with the present four-bow interchangeability feature. Moreover, each of the features may be interchanged and intermixed between any and all of the disclosed embodiments, and any of the claims may be multiply dependent on and intermixed with any of the others. Additional changes and modifications are not to be regarded as a departure from the spirit or the scope of the present invention.

The invention claimed is:

1. An automotive vehicle convertible roof apparatus comprising:
   (a) at least one flexible fabric roof cover;
   (b) a rear window attached to the roof cover;
   (c) a top stack mechanism moveable from a closed position to an open position, the top stack mechanism comprising at least one roof bow attached to the roof cover above and adjacent to the rear window as viewed when in the closed position;
   (d) a first pivot location and at least a spaced apart second pivot location;
   (e) a proximal end portion of the at least one roof bow being rotatably attached to the first pivot location when the at least one roof cover is of a first closed size; and
   (f) the proximal end portion of the at least one roof bow being rotatably attached to the second pivot location when the at least one roof cover is of a second closed size, the second closed size being larger than the first closed size.

2. The apparatus of claim 1, wherein the at least one roof cover comprises a fastback roof cover of the first closed size and an interchangeable separate squareback roof cover of the second closed size, only one of the roof covers being secured to the top stack mechanism at a time.

3. The apparatus of claim 1, wherein the at least one roof bow comprises a fastback roof bow and an interchangeable separate squareback roof bow, the fastback and squareback roof bows have a different size or shape, and the at least one roof bow being a four-bow.

4. The apparatus of claim 1, wherein:
   the top stack mechanism further comprises a forwardmost one-bow, a two-bow, a three-bow, side rails, a balance link, a sector gear and an electric motor, which are all identical for both the smaller and larger closed sizes of the at least one roof cover; and
   the second pivot location being above and forward of the first pivot location in all operating conditions of the top stack mechanism.

5. The apparatus of claim 1, wherein the at least one roof cover comprises a single roof cover including a fastener engageable when the roof cover is contracted to the smaller closed size and disengageable when the roof cover is expanded to the larger closed size.

6. The apparatus of claim 1, wherein the at least one roof bow is a pair of interchangeable and different four-bows which each comprise:
   a substantially U-shaped segment including a pair of spaced apart upwardly extending legs and a laterally extending middle located above the rear window when in the closed position; and
   a connector including an end rotatably coupled to the mounting bracket and a threaded rod adjustably coupled to an end of one of the legs.

7. The apparatus of claim 1, further comprising:
   at least one stationary mounting bracket including the pivot locations;
   an automotive sport utility vehicle including a passenger compartment between side passenger doors, and a rear compartment with an uppermost portion of a structural side wall adjacent and coupling to the mounting bracket;
   a roll bar secured to the vehicle and spanning above the rear compartment; and
   a brace comprising an upper end portion including an upwardly and rearwardly facing surface stationarily secured to the roll bar and a lower portion stationarily coupled to at least one of: the top stack mechanism or the mounting bracket.

8. A method of assembling an automotive vehicle convertible roof apparatus, the method comprising:
   (a) attaching a retractable roof cover(s) to a set of moveable side rails, front bow and linkages in a fastback roof cover configuration;
   (b) interchangeably attaching the retractable roof cover(s) to the same set of side rails, front bow and linkages in a squareback roof cover configuration; and
   (c) manually causing a four-bow to have a different length depending on which roof cover configuration is used, by moving its pivot point.

9. The method of claim 8, wherein the causing step (c) comprises interchanging between multiple different versions of the four-bow depending on the roof cover configuration desired.

10. The method of claim 8, wherein the causing step (c) comprises moving the pivot point to a raised location for the squareback roof cover configuration as compared to a lower location for the fastback roof cover configuration.

11. The method of claim 8, wherein the causing step (c) comprises manually moving a fastener to adjust a length of the four-bow.

12. The method of claim 8, further comprising unzipping a zipper to change between the roof cover configurations of a single fabric roof cover.

13. The method of claim 8, further comprising:
   stationarily securing a topstack mechanism which comprises a vehicular mounting bracket, an electric motor, the side rails and the linkages, to a roll bar at a position above the vehicular mounting bracket and the electric motor; and
   pivotably coupling the four-bow to the mounting bracket at a position higher than the electric motor and a vehicular beltline.

14. An automotive vehicle convertible roof apparatus comprising:
   (a) at least one convertible roof;
   (b) a rear window attached to the convertible roof;
   (c) a top stack mechanism moveable from a closed position to an open position, the top stack mechanism comprising at least one roof bow attached to the convertible roof adjacent to an upper edge of the rear window as viewed when in the closed position;
   (d) at least one stationary mounting bracket including a first pivot location and at least a spaced apart second pivot location;
   (e) the at least one roof bow being rotatably attached to the first pivot location when the at least one convertible roof is of a first closed size; and
   (f) the at least one roof bow being rotatably attached to the second pivot location when the at least one convertible roof is of a second closed size, the second size being different than the first size;

(g) an actuator affixed to the mounting bracket, the actuator being operable to open and close the top stack mechanism;

(h) an automotive sport utility vehicle including a passenger compartment between side passenger door openings, and a rear compartment with the mounting bracket being stationarily affixed within the rear compartment;

(i) a roll bar secured to the vehicle and spanning above the rear compartment; and (j) a brace comprising an upper portion stationarily secured to the roll bar and a lower portion stationarily coupled to at least one of: the top stack mechanism or the mounting bracket.

15. The apparatus of claim 14, wherein the at least one convertible roof comprises a fastback roof cover of the first closed size and an interchangeable separate squareback roof cover of the second closed size, only one of the roof covers being secured to the top stack mechanism at a time.

16. The apparatus of claim 14, wherein the at least one roof bow comprises a fastback roof bow and an interchangeable separate squareback roof bow, the fastback and squareback roof bows have a different size or shape, and the at least one roof bow being a four-bow.

17. The apparatus of claim 14, wherein:
the top stack mechanism further comprises a forwardmost one-bow, a two-bow, a three-bow, side rails, a balance link, a sector gear and the actuator which is an electric motor, which are all identical for both the closed sizes of the at least one roof cover; and the second pivot location being above and forward of the first pivot location in all operating conditions of the top stack mechanism.

18. The apparatus of claim 14, wherein the at least one convertible roof comprises a single flexible convertible roof including a fastener engageable when the roof cover is contracted to the first closed size and disengageable when the roof cover is expanded to the second closed size.

* * * * *